United States Patent [19]

DeTreville

[11] Patent Number: 6,131,150
[45] Date of Patent: Oct. 10, 2000

[54] SCALED MEMORY ALLOCATION SYSTEM

[75] Inventor: John DeTreville, Palo Alto, Calif.

[73] Assignee: Digital Equipment Corporation, Houston, Tex.

[21] Appl. No.: 08/692,649

[22] Filed: Aug. 6, 1996

Related U.S. Application Data

[63] Continuation of application No. 08/131,829, Oct. 5, 1993, abandoned.

[51] Int. Cl.$^7$ ..................................................... G06F 12/02
[52] U.S. Cl. ............................................ 711/173; 711/170
[58] Field of Search ........................ 395/497.01, 497.02, 395/497.04; 711/170, 171, 173; 710/56

[56] References Cited

U.S. PATENT DOCUMENTS

| | | | |
|---|---|---|---|
| 4,757,438 | 7/1988 | Thatte et al. | 709/100 |
| 4,989,137 | 1/1991 | Oxley et al. | 711/203 |
| 5,109,336 | 4/1992 | Guenther et al. | 711/171 |
| 5,125,086 | 6/1992 | Perazzoli, Jr. | 711/159 |
| 5,159,678 | 10/1992 | Wengelski et al. | 711/153 |
| 5,367,637 | 11/1994 | Wei | 710/56 |
| 5,561,785 | 10/1996 | Blandy et al. | 711/170 |
| 5,561,786 | 10/1996 | Morse | 711/170 |
| 5,577,243 | 11/1996 | Sherwood et al. | 707/7 |

OTHER PUBLICATIONS

Shen, K.K et al, "A Weighted Buddy Method for Dynamic Storage Allocations", Comm. of the ACM, vol. 17, No. 10, Oct. 1974 pp. 558–562.

Johnson, Theodore et al, "Space Efficient Parallel Buddy Memory Management", Computing and Information, 1992 Intnational Conf, pp. 128–132.

Bellaachia, Abdelghani et al, "Partitioning on the Banyan–Hypercube Networks.", Frontiers of Massively Parallel Computation, 1990 pp. 343–351.

"Operating Systems Design And Implementation" pp. 201–206; Andrew S. Tanenbaum; copyright 1987 by Prentice–Hall, Inc. Englewood Cliffs, New Jersey, USA.

"Operating Systems: Design and Implementation" pp. 201–203; Andrew S. Tanenbaum; copyright 1987 by Prentice–Hall, Inc., Englewood Cliffs, New Jersey, USA.

"The Design of Operating Systems for Small Computer Systems" pp. 248–257; Stephen H. Kaisler; copyright 1983 by John Wiley & Sons Inc., New York, New York, USA.

"The Art of Computer Programming" pp. 435–451; second edition; Donald E. Knuth; vol. 1/ Fundamental Algorithms, The Addison–Wesley Series in Computer Science and Information Processing; Copyright 1973 by Addison–Wesley Publishing Co., Reading, Massachusetts, USA.

B. Cranston, et al, "A Simplified Recombination Scheme for the Fibonacci Buddy System", Communications of the ACM, vol. 18, No. 5, Jun. 1975, pp. 331–332.

J. Peterson, et al, "Buddy Systems", Communications of the ACM, vol. 20, No. 6, Jun. 1977, pages 421–431.

K. Knowlton, "A Fast Storage Allocator", Communications of the ACM, vol. 8, No. 10, Oct. 1965, pp. 623–625.

D. Hirschberg, "A Class of Dynamic Memory Allocation Algorithms", Communications of the ACM, vol. 16, No. 10, Oct. 1973, pp. 615–618.

K. Shen, et al, "A Weighted Buddy Method for Dynamic Storage Allocation", Communications of the ACM, vol. 17, No. 10, Oct. 1974, pp. 558–562.

*Primary Examiner*—Eddie P. Chan
*Assistant Examiner*—Kevin L. Ellis
*Attorney, Agent, or Firm*—Cesari and McKenna

[57] ABSTRACT

A memory of a computer system is partitioned into a plurality of allocable blocks. Subsets of the allocable blocks are organizing into a plurality of heaps, each heap having a different designated subset of the allocable blocks. The sizes of the allocable blocks of each of the heaps are determined by scaling a progression of numbers, preferably computed as an integer power of two, by a selected integer different for each heap. The scaled blocks, when allocated, can be used to store a segment of data to be processed by the computer system.

19 Claims, 3 Drawing Sheets

SCALED MEMORY ALLOCATION SYSTEM

This application is a continuation of application Ser. No. 08/131,829, filed Oct. 5, 1993, now abandoned.

FIELD OF THE INVENTION

The present invention relates generally to computer systems, and more particularly to allocating blocks of computer system memories to store segments of data.

BACKGROUND OF THE INVENTION

It is a common problem in computer systems to efficaciously manage the allocation of portions of a memory for storing segments of data. Data can include stored programs for manipulating the data. It is a particular problem to maximize the utilization of memory which can be used for storing such segments, at reasonable costs. The sizes of the allocable portions or "blocks" of memory are generally restrained by a predetermined allocation system. However, the sizes of the segments of data used or generated by programs can be unpredictably distributed over a widely varying range of sizes.

In designing an effective memory allocation system, one problem is to balance the efficiency of space utilization with the time required to allocated the space. Space utilization efficiencies are affected by memory fragmentation. Memory fragmentation makes otherwise free portions or blocks of memory unavailable for allocation. If the memory is highly fragmented, space is wasted. However, complex processes which minimize memory fragmentation consume time, and increase costs.

Memory fragmentation can be characterized as either internal or external fragmentation. Internal fragmentation is due to misfits between unpredictably sized segments of data and allocable blocks usually having predetermined sizes. If the incremental sizes difference between various allocable blocks is made large, a "good fit" with data segments is less likely, and the degree of internal fragmentation is high.

Conversely, if the incremental size differences between allocable blocks is made small, "checker-boarding" is observed resulting in a high degree of external fragmentation. That is, distributed throughout memory there are many small sized non-contiguous blocks which can only accommodate small segments of data, and are unavailable for larger segments of data.

Previous approaches to solve these problems have made trade-offs between space allocation efficiencies, e.g., reduced fragmentation, and the cost or time required to gain these efficiencies. For example, many versions of the "UNIX" operating system simply allocate memory blocks in sizes which are multiples of the powers of two. In other words, if the minimum allocable quantity is a byte, or a word (a word including a fixed number of bytes), the various sizes of the allocable blocks can be expressed as an integer power of two, e.g., $2^i$, where "i" is an integer. However, blocks can not be split or coalesced once created.

Although this type of allocation has a low processing cost, internal fragmentation tends to be high since many blocks might be almost twice as large as required. This is true because the ratio of the incremental differences between consecutively sized blocks is 2 to 1. That is, the blocks have relative sizes according to the progression of integer values 1, 2, 4, 8, 16, 32, and so forth. External fragmentation can also be high, since the pattern of allocable blocks can shift over time, and blocks previously created may be of the wrong size for current use.

Systems known as binary-buddy block systems have been developed to reduce external fragmentation inefficiencies. Binary-buddy block systems split blocks into a pair of equal sized allocable buddy blocks to accommodate smaller sized data segments. Subsequently, after use, the pair of buddy blocks can be coalesced to reform the original larger sized block, thereby reducing external fragmentation. However, the ratio of the incremental differences between consecutively sized blocks is still 2 to 1, thus the degree of internal fragmentation remains relatively high.

Internal fragmentation can be reduced by using Fibonacci numbers for proportioning block sizes. If the allocable memory blocks are sized according to the Fibonacci number series, the ratio between consecutively sized blocks can be reduced to approximately 1.6 to 1, thereby decreasing worst-case and average case internal fragmentation. However, with the Fibonacci system, the decrease in internal fragmentation is observed to be at a cost of a matching increase in external fragmentation.

Another system employed to minimize the ratio of consecutively sized blocks is a weighted-buddy block system. In the weighted-buddy block system the blocks are sized as multiples of either $2^i$, or $3(2^i)$. The weighted-buddy block system decreases the worst-case incremental size difference ratio to approximately 1.5 to 1. However, not all allocable blocks in memory can be of a given size. In particular, at most three quarter of the allocable memory space can be used for requests for blocks of size $3(2^i)$ for a given i, increasing external fragmentation. And, as for the Fibonacci system, the weighted-buddy block system reduces internal fragmentation at the expense of external fragmentation.

Taking the foregoing into consideration, it is apparent that there is a need for a memory allocation system which reduces the ratio between consecutively sized blocks in order to reduce internal fragmentation. Additionally, it is desirable that this smaller ratio be reached without increasing external fragmentation. Furthermore, the system should not increase the costs associated with allocating memory space. It is to these ends that the invention is directed.

SUMMARY OF THE INVENTION

The present invention is directed to a method and apparatus for efficiently managing blocks of memory of a computer system. The blocks of memory are for storing segments of data. New data structures and methods are provided which reduce the ratio of size differences between progressively larger blocks of memory to a smaller number than possible by prior art memory allocation systems to decrease internal fragmentation without increasing external fragmentation and processing costs.

According to the principles of the invention, the memory of the computer system is partitioned into a plurality of allocable blocks. Subsets of the allocable blocks are organizing into a plurality of heaps, each heap having a different designated subset of the allocable blocks. The sizes of the allocable blocks of each of the heaps are scaled according to a designated progression of integer values to minimize internal fragmentation. The designated progression of integer values is computed by multiplying a selected integer times a progression of numbers. Preferably, the progression of numbers is computed as an integer power of two. The scaled blocks, when allocated, can be used to store a segment of data to be processed by the computer system.

Furthermore, to reduce internal fragmentation, that is in order to achieve the best fit between an allocable block and a segment of data, the size of a particular segment of data is rounded up to a next smallest integer. The next smallest integer is selected from a particular one of the designated progressions of integer values used to scale the allocable blocks of the heaps. A particular heap is chosen corresponding to the particular designated progression of integer values including the next smallest integer. A smallest allocable block is selected from the particular heap, where the smallest allocable block has a size not smaller than the next smallest integer.

To minimize external fragmentation, a binary-buddy block splitting scheme is applied to the smallest allocable block. A determination is made to see if the next smallest integer is more than half the size of the next smallest allocable block. In response to a false determination, the next smallest block is divided into a first block and a second block of equal sizes. The first block is returned to the chosen heap, and the second block is made the next smallest allocable block, and the determining step is repeated. Otherwise in response to a true determination, the next smallest allocable block is allocated to store said segment of data.

DETAILED DESCRIPTION OF A PREFERRED EMBODIMENT

Figure 1:
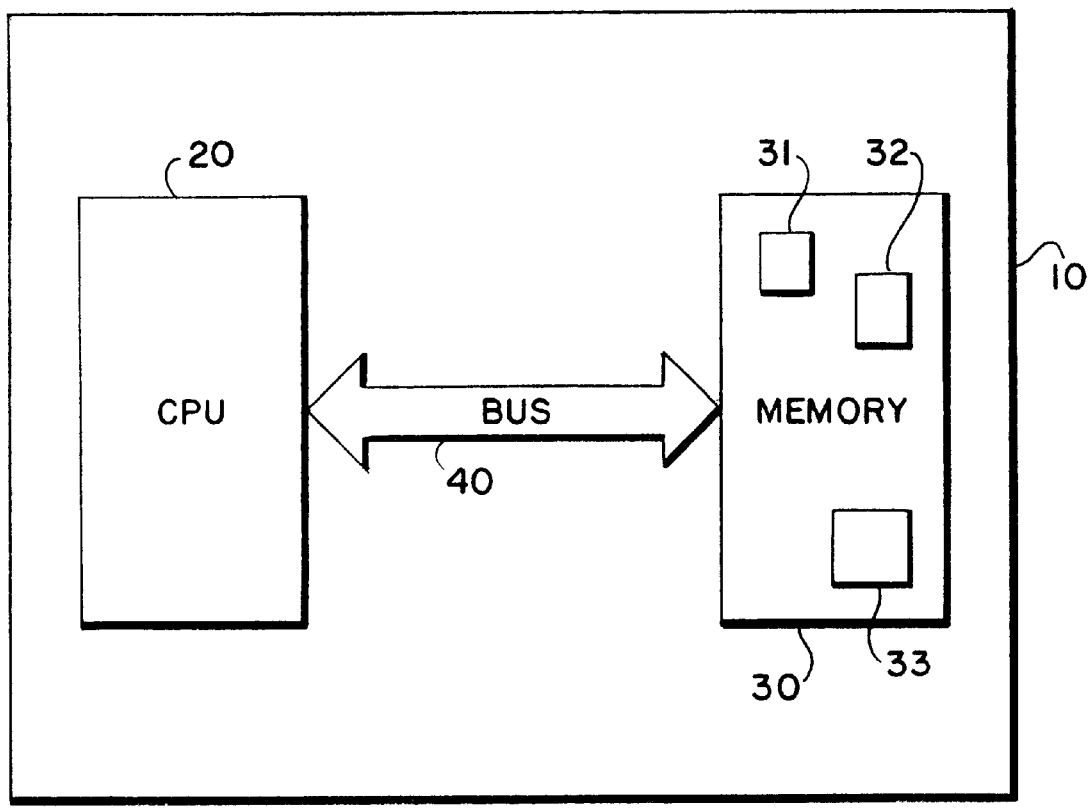
FIG. 1 is a block diagram of a computer system which can use the invention.

FIG. 1 shows a computer system 10 which may utilize structures and processes in accordance with the principles of the invention. The computer system 10 may comprise a central processor unit (CPU) 20 for processing data and a memory 30 for storing data, the data can include programs for manipulating the data. The CPU 20 and the memory 30 are connected to each other by a communications bus 40. The computer system can also include other components such an input/output (I/O) sub-system, not shown.

During operation of the computer system 10, programs executing in the CPU 20 have temporary needs for portions of the memory for storing data generated or processed by the programs. The amount of memory space required for storing data varies dynamically, and is not known a priori. Therefore, data are stored in allocable portions of the memory 30 called blocks, generally indicated by reference numerals 31–33 in FIG. 1. The blocks 31–33 are available for dynamic allocation as needed.

Most known memory allocation systems partition an entire memory according to singular sizing technique. There are known problems with such prior art allocation systems, as previously described. Improper management of the memory 30 disturbs system performance and increases costs. For example, less than full utilization of the memory 30 wastes valuable unproductive memory components, and lengthy processing to manage the allocation of blocks of memory consume system resources, power and labor.

Application of the principles of the invention can improve memory utilization without a substantial increase in cost. A preferred embodiment of the invention is now described, first with respect to the structural elements, and then with reference to the process steps that are used to manipulate the structural elements.

STRUCTURES

Figure 2:
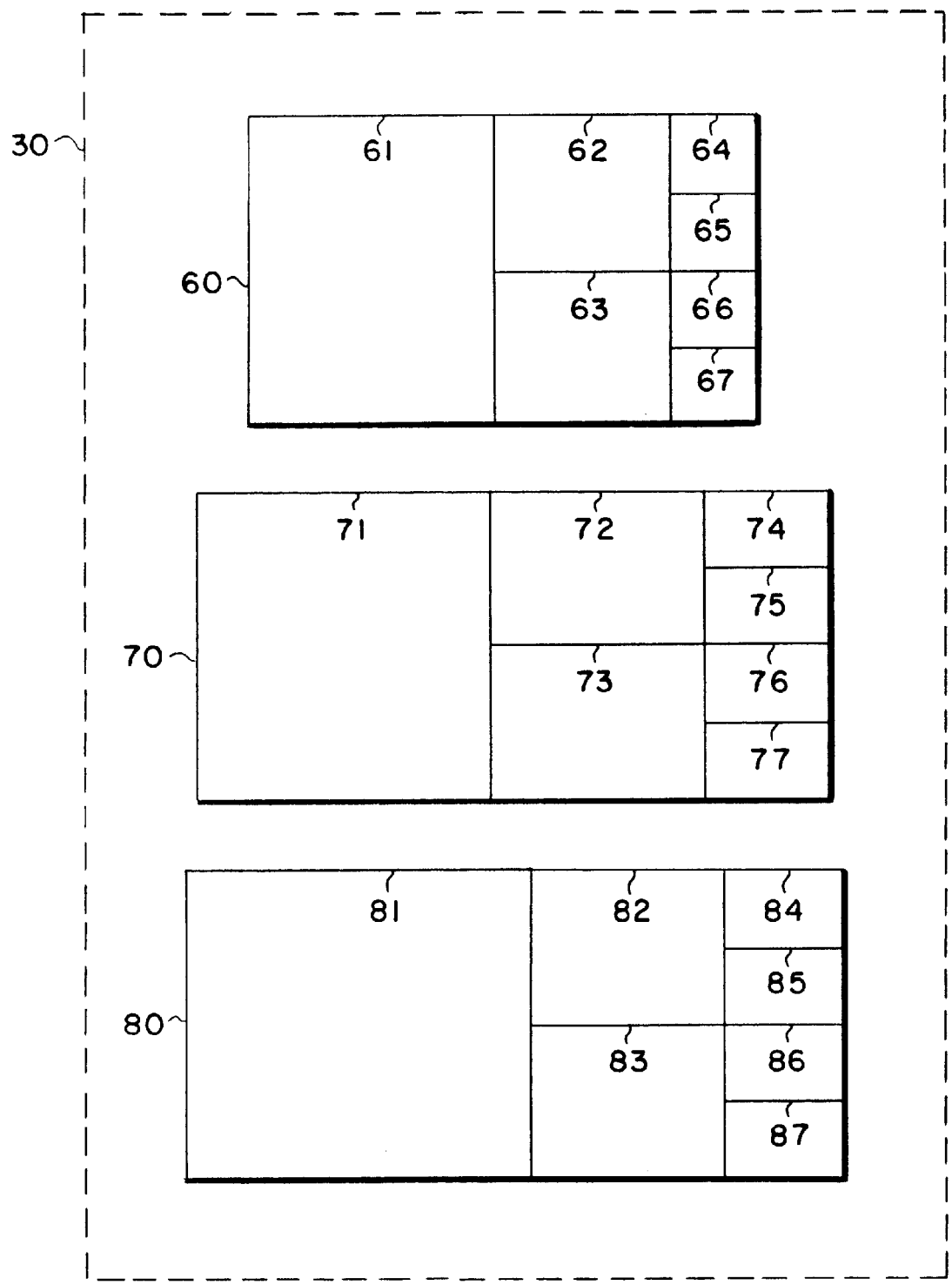
FIG. 2 is a block diagram of a memory of the computer system of FIG. 1 structured according to a preferred embodiment of the invention.

As shown in FIG. 2, and in accordance with the principles of the invention, the entire allocable amount of the memory 30, is partitioned into a plurality of allocable blocks 61–67, 71–77, and 81–87. Each allocable block including, perhaps, one or more bytes of the memory 30 for storing data. Each byte has an address for storing and retreiving the data.

Subsets of the allocable blocks 61–67, 71–77, and 81–87 are organized into a plurality of heaps, for example the three heaps 60, 70, and 80, respectively. As used herein, a "heap" is a portion of memory including a subset of allocable blocks. Although, the preferred embodiment illustrated in FIG. 2 shows three heaps 60, 70, and 80, it will become apparent from the description which follows that the memory 30 can be organized into a different number of heaps. For example, alternative embodiments of the invention as discussed below, can include two, four, or more heaps. This is in sharp contrast with the traditional single heap systems previously used. As will be explained more fully bellow, distributing the allocable blocks over a plurality of heaps provides significant advantages.

The heaps 60, 70, and 80 do not necessarily have to be the same size, nor do they have to be physically contiguous. For example, the heaps 60, 70, and 80 of the preferred embodiment of the invention can have sizes which are multiples of 6 KiloBytes (KB), 8 KB, and 10 KB, respectively.

In accordance with the invention, the sizes of the allocable blocks in each of the heaps 60, 70, and 80 are preferably scaled according to a designated progression of integer values, the progression of integer values computed by multiplying a selected integer times a progression of numbers. Preferably, the progression of numbers is computed as an integer power of two.

In the preferred embodiment, the selected integers for scaling the three heaps 60, 70, and 80 are 3, 4, and 5. Therefore, the allocable blocks 61–67, 71–77, and 81–87 have sizes which are multiples of $3(2^i)$, $4(2^i)$, and $5(2^i)$, respectively.

The scaled allocable block in the three heaps 60, 70, and 80 have sizes which are multiples of 3, 4, 5, 6, 8, 10, 12, 16, 20, and so forth. The desired result is that the largest ratio of incremental differences between consecutively sized blocks is at most 1.33 to 1. This is a substantial improvement over the ratio of 1.6 to 1 obtained by the Fibonacci system, or the 1.5 ratio obtained by the weighted-buddy block system. Therefore, the preferred embodiment reduces the amount of the memory space wasted due to internal fragmentation.

Other scaling factors can also be used if the memory is organized into the three heaps 60, 70, and 80. Table 1 shows integer scaling values which all reduce the incremental block size ratios below 1.3 to 1.

TABLE 1

| Size Ratio | Heap 1 | Heap 2 | Heap 3 |
|---|---|---|---|
| 1.286 | 7 | 9 | 11 |
| 1.267 | 12 | 15 | 19 |
| 1.265 | 27 | 34 | 43 |
| 1.264 | 42 | 53 | 67 |
| 1.261 | 46 | 58 | 73 |

Using the first progression 7, 9, 11, 14, 18, 22, 28, 36, 44, and so forth, has a maximum size difference of only 1.286. The other scaled progressions shown in Table 1 have even smaller maximum size differences which tend toward the third root of 2, which is 1.2599. Alternatively, the memory 30 can be organized into four heaps, with any of the possible scaled progressions as shown in Table 2.

TABLE 2

| Size Ratio | Heap 1 | Heap 2 | Heap 3 | Heap 4 |
|---|---|---|---|---|
| 1.250 | 4 | 5 | 6 | 7 |
| 1.231 | 8 | 9 | 11 | 13 |
| 1.222 | 9 | 11 | 13 | 15 |
| 1.214 | 10 | 12 | 14 | 17 |
| 1.200 | 15 | 18 | 21 | 25 |
| 1.194 | 22 | 26 | 31 | 37 |
| 1.193 | 48 | 57 | 68 | 81 |

Or, the memory 30 can be organized into five heaps with any of the scaled progressions shown in Table 3.

TABLE 3

| Size Ratio | Heap 1 | Heap 2 | Heap 3 | Heap 4 | Heap 5 |
|---|---|---|---|---|---|
| 1.200 | 5 | 6 | 7 | 8 | 9 |
| 1.182 | 10 | 11 | 13 | 15 | 17 |
| 1.167 | 12 | 14 | 16 | 18 | 21 |
| 1.160 | 19 | 22 | 25 | 29 | 33 |
| 1.156 | 26 | 30 | 34 | 39 | 45 |
| 1.152 | 35 | 40 | 46 | 53 | 61 |

Scaling progression for memory organized into two heaps are also possible.

TABLE 4

| Size Ratio | Heap 1 | Heap 2 |
|---|---|---|
| 1.500 | 2 | 3 |
| 1.429 | 5 | 7 |
| 1.417 | 12 | 17 |
| 1.415 | 29 | 41 |

By partitioning the memory into a plurality of heaps, and by allocating blocks within each heap according to a progression of scaling factors distinct advantages in allocation efficiencies can be gained over that which is known in the prior art.

In addition, the scaled sized allocable blocks can be managed with a fairly simple and inexpensive binary-buddy block system to minimize external fragmentation. It can be observed that the binary-buddy block system decreases external fragmentation. Large blocks can be split into a pair of equal sized smaller blocks to better fit a segment of data. When the pair of buddy blocks are no longer used for storing segments of data, they can be coalesced to reform the original larger blocks. Buddy block system for managing allocable blocks are well known in the art, for details please see "The Art of Computer Programming" D. Knuth, Addison-Wesley, 1973, pp. 435–451, "The Design of Operating Systems for Small Computer Systems" S. Kaisler, Wiley Publications, 1983, pp. 248–257, and "Operating Systems: Design and Implementation" A. Tanenbaum, Prentice-Hall, 1987, pp. 201–203.

PROCESSES

The allocation method according to the preferred embodiment of the invention will now be described. The method minimizes internal and external fragmentation without a substantial increase in processing cost.

It is assumed that the memory 30 is preferably partitioned into three heaps 60, 70 and 80, and the scaling factors for the variously scaled blocks 61–67, 71–77, and 81–87 are the integer number progression $3(2^i)$, $4(2^i)$, and $5(2_i)$. It should become apparent that the method can also be adapted for memories that are partitioned into a different number of heaps, and where the sizes of the blocks are scaled according to other integer progressions, for example, the heaps and progression of integer values tabulated above, in Tables 1 to 4.

Figure 3:
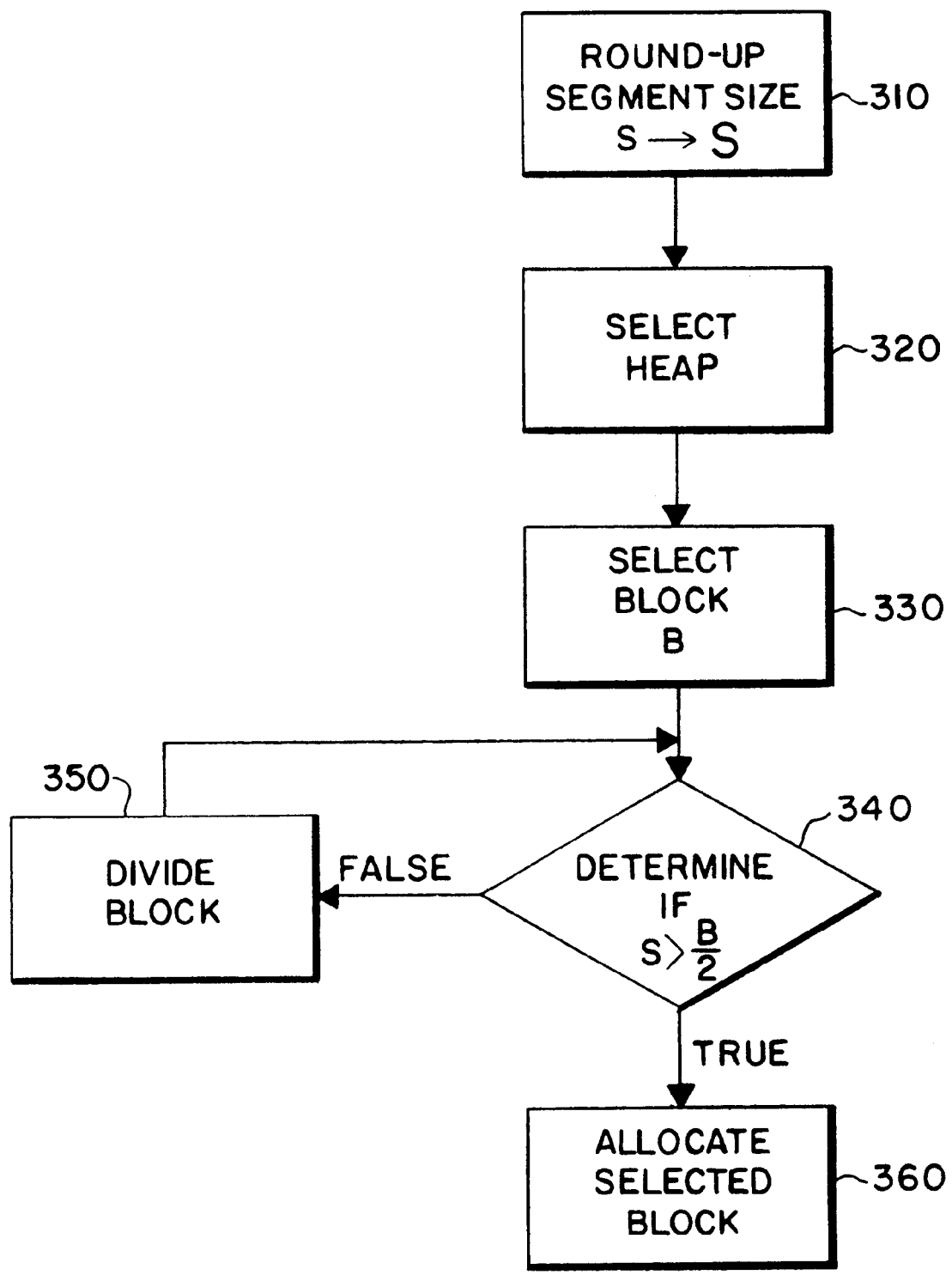
FIG. 3 is a flow diagram of a preferred method for allocating blocks from the memory of FIG. 2.

Now with reference to FIG. 3, if the size of the segment of data requiring memory is "s", in step 310 s is rounded up to the next smallest integer "S," where S is an integer selected from a particular one of the scaled progressions of the powers of two, i.e., $3(2^i)$, $4(2^i)$, or $5(2^i)$ In step 320, the corresponding heap which is characterized by the integer value S is chosen. For example, if the integer value S is included in the progression $3(2^i)$, than the first heap 60 is chosen.

In steps 330, a smallest allocable block is selected from the chosen heap having a size "B" which is not smaller than S.

In step 340, it is determined if S, the rounded-up size of the data segment is more than half the size of the selected block, e.g., is S>B/2.

If the determination in step 340 was false, then in step 350, the selected block is divided into a first-buddy block and a second buddy block, the first and second buddy blocks having equal sizes. The first buddy block is returned to the chosen heap, and the second buddy block is made the selected block, repeat step 340.

Otherwise, if the determination in step 340 was true, then in step 360, the selected block is allocated for storing the segment of data requiring memory.

After an allocated block is no longer needed for storing data, a determination is made if the block is associated with a buddy block. If both blocks of a buddy block pair are unallocated, the pair of buddy blocks are coalesced into a single block. The coalesced block is returned to the chosen heap from which the allocated block was selected.

Although the foregoing has described preferred embodiments of the invention, those skilled in the art will recognize that changes to these embodiments can be made without departing from the principles of the invention, the scope of which are defined in the appended claims.

What is claimed is:

1. A computer implemented method for allocating memory of a computer system, the memory including bytes having addresses for storing and retrieving data stored in the bytes, the bytes partitioned to form allocable blocks, said allocable blocks having at least one byte, comprising the steps of:

organizing subsets of said allocable blocks into a plurality of heaps, each of said plurality of heaps having a designated subset of said allocable blocks;

determining the sizes of said designated subset of said allocable blocks of each of said plurality of heaps according to a designated progression of integer values, said designated progression of integer values computed by scaling a progression of numbers by a selected integer, the selected integer being different for each of said plurality of heaps;

storing, in blocks allocated in said memory according to the determined sizes, data processed by the computer system.

2. The method as in claim 1 wherein said designated progression of integer values is computed as an integer power of two.

3. The method as in claim 2 further including the steps determining the size of a segment of data to be stored in the memory, rounding up the size of said segment of data to a next smallest integer, said next smallest integer selected from said designated progression of integer values of each of said plurality of heaps;

choosing a particular heap corresponding to said designated progression of integer values of said particular heap including said next smallest integer, selecting a smallest allocable block from said particular heap, said smallest allocable block having a size not smaller than said next smallest integer.

4. The method as in claim 3 further including the steps of determining if said next smallest integer is more than half the size of said smallest allocable block, in response to a false determination, dividing said smallest allocable block into a first block and a second block, returning said first block to said chosen particular heap, making said second block a next smallest allocable block to repeat said determining step, otherwise in response to a true determination, allocating said smallest allocable block to store said segment of data.

5. The method as in claim 4 wherein said first and second block have the same size.

6. The method as in claim 1 wherein said plurality of allocable blocks are organized into a first heap, a second heap, and a third heap, and wherein said designated progressions of integer values are $3(2^i)$, $4(2^i)$, and $5(2^i)$.

7. The method as in claim 1 wherein said plurality of allocable blocks are organized into a first heap, a second heap, and a third heap, and wherein said designated progressions of integer values which are $7(2^i)$, $9(2^i)$, and $11(2^i)$.

8. The method as in claim 1 wherein said plurality of allocable blocks are organized into a first heap, a second heap, a third heap, and a fourth heap, and wherein said designated progressions of integer values which are $4(2^i)$, $5(2^i)$, $6(2^i)$, and $7(2^i)$.

9. The method as in claim 1 wherein said plurality of allocable blocks are organized into a first heap and a second heap, and wherein said designated progression of integer values are $2(2^i)$ and $3(2^i)$.

10. An apparatus for allocating memory of a computer system the memory having addresses for storing and retrieving data stored in the bytes, the bytes partitioned to form allocable blocks, said allocable blocks having at least one byte, comprising:

means for organizing subsets of said allocable blocks into a plurality of heaps, each of said plurality of heaps having a designated subset of said allocable blocks;

means for scaling the size of said designated subset of allocable blocks of each of said plurality of heaps according to a designated progression of integer values, said designated progression of integer values computed by multiplying a selected integer times a progression of numbers computed as an integer power of two, the selected integer being different for each of said plurality of heaps, to store data in said memory, said data processed by the computer system.

11. The apparatus as in claim 10 further including means for determining the size of a segment of data to be stored in the memory, means for rounding up the size of said segment of data to a next smallest integer, said next smallest integer selected from said designated progression of integer values of each of said plurality of heaps;

means for choosing a particular heap corresponding to said designated progression of integer values including said next smallest integer, means for selecting a smallest allocable block from said particular heap, said smallest allocable block having a size not smaller than said next smallest integer.

12. The apparatus as in claim 11 further including means for determining if said next smallest integer is more than half the size of said selected block, and means, responsive to a false determination, for dividing said smallest allocable block into a first block and a second block, returning said first block to said chosen heap, and making said second block a next smallest allocable block;

means, responsive to a true determination, for allocating said smallest allocable to store said segment of data.

13. The apparatus as in claim 12 wherein said first and second block have the identical size.

14. The apparatus as in claim 10 wherein said plurality of allocable blocks are organized into a first heap, a second heap, and a third heap, and wherein said designated progressions of integer values are $3(2^i)$, $4(2^i)$, and $5(2^i)$.

15. The apparatus as in claim 10 wherein said plurality of allocable blocks are organized into a first heap, a second heap, and a third heap, and wherein said designated progressions of integer values are $7(2^i)$, $9(2^i)$, and $11(2^i)$.

16. The apparatus as in claim 10 wherein said plurality of allocable blocks are organized into a first heap, a second heap, a third heap, and a fourth heap, and wherein said designated progressions of integer values are $4(2^i)$, $5(2^i)$, $6(2^i)$, and $7(2^i)$.

17. The apparatus as in claim 10 wherein said plurality of allocable blocks are organized into a first heap and a second heap, and wherein said designated progression of integer values are $2(2^i)$ and $3(2^i)$.

18. A method for allocating memory of a computer system, comprising the steps of:

partitioning the memory into a plurality of allocable blocks;

organizing said allocable blocks into a plurality of subsets;

scaling the sizes of said allocable blocks of each of said subsets according to a designated progression of integer values, said designated progression of integer values computed by multiplying a selected integer times a progression of numbers, said selected integer different for each of said subsets;

storing, in said memory, data in said allocable blocks, said allocable blocks scaled according to the determined sizes.

19. The method as in claim 18 wherein said progression of numbers is expressed as the powers of two.

* * * * *